United States Patent
Blanchflower

(10) Patent No.: US 10,176,392 B2
(45) Date of Patent: Jan. 8, 2019

(54) OPTICAL CHARACTER RECOGNITION

(71) Applicant: Longsand Limited, Cambridge (GB)

(72) Inventor: Sean Blanchflower, Cambridge (GB)

(73) Assignee: LONGSAND LIMITED, Cambridge (GB)

( * ) Notice: Subject to any disclaimer, the term of this patent is extended or adjusted under 35 U.S.C. 154(b) by 0 days.

(21) Appl. No.: 15/114,783

(22) PCT Filed: Jan. 31, 2014

(86) PCT No.: PCT/EP2014/051961
§ 371 (c)(1),
(2) Date: Jul. 27, 2016

(87) PCT Pub. No.: WO2015/113635
PCT Pub. Date: Aug. 6, 2015

(65) Prior Publication Data
US 2016/0342852 A1 Nov. 24, 2016

(51) Int. Cl.
*G06K 9/18* (2006.01)
*G06K 9/62* (2006.01)

(52) U.S. Cl.
CPC ............. *G06K 9/18* (2013.01); *G06K 9/6288* (2013.01); *G06K 9/6292* (2013.01); *G06K 9/6296* (2013.01); *G06K 2209/01* (2013.01)

(58) Field of Classification Search
None
See application file for complete search history.

(56) References Cited

U.S. PATENT DOCUMENTS

| 5,418,864 A | 5/1995 | Murdock et al. |
| 5,805,747 A | 9/1998 | Bradford |

(Continued)

FOREIGN PATENT DOCUMENTS

| EP | 0621556 | 4/1994 |
| GB | 2270406 | 3/1994 |

OTHER PUBLICATIONS

Stack Overflow, "Multi Decision Engine for Increasing OCR Accuracy"; 2010; 3 pages; http://stackoverflow.com/questions/4465961/multi-decision-engine-for-increasing-ocr-accuracy.

(Continued)

*Primary Examiner* — Bernard Krasnic

(57) ABSTRACT

Optical character recognition is described in various implementations. In one example implementation, a method may include receiving a plurality of optical character recognition (OCR) outputs provided by a respective plurality of OCR engines, each of the plurality of OCR outputs being representative of text depicted in a portion of an electronic image. The method may also include identifying a document context associated with the electronic image, and generating an output character set by applying a character resolution model to resolve differences among the plurality of OCR outputs. The character resolution model may define a probability of character recognition accuracy for each of the plurality of OCR engines given the identified document context. The method may also include updating the character resolution model to generate an updated character resolution model such that subsequent generating of output character sets are based on the updated character resolution model.

20 Claims, 3 Drawing Sheets

(56) References Cited

U.S. PATENT DOCUMENTS

| | | | |
|---|---|---|---|
| 7,769,249 B2 | 8/2010 | Kasatani | |
| 8,331,739 B1 | 12/2012 | Abduikader et al. | |
| 2004/0037470 A1* | 2/2004 | Simske | G06F 17/273 |
| | | | 382/229 |
| 2005/0286772 A1 | 12/2005 | Albertelli | |
| 2006/0251338 A1* | 11/2006 | Gokturk | G06F 17/30253 |
| | | | 382/305 |
| 2008/0063279 A1 | 3/2008 | Vincent et al. | |
| 2011/0103688 A1 | 5/2011 | Urbschat et al. | |
| 2012/0134589 A1 | 5/2012 | Reddy | |
| 2014/0348392 A1* | 11/2014 | Burry | G06K 9/325 |
| | | | 382/105 |

OTHER PUBLICATIONS

International Searching Authority, "Notification of Transmittal of the International Search Report and the Written Opinion", PCT/EP2014/051961, dated Jul. 4, 2014, 12 pages.

Lam, L. et al. "Combination of Multiple Classifier Decisions for Optical Character Recognition", World Scientific Publishing Company, pp. 79-101. Section 2.3 Bayesian Combination Rule, Section 3, Experimental Data and Procedure, 1997.

\* cited by examiner

# OPTICAL CHARACTER RECOGNITION

CLAIM FOR PRIORITY

The present application is a national stage filing under 35 U.S.C. § 371 of PCT application number PCT/EP2014/051961, having an international filing date of Jan. 31, 2014, the disclosure of which is hereby incorporated by reference in its entirety.

BACKGROUND

Optical character recognition (OCR) refers to a process of converting an image depicting human-readable text into a document containing computer-readable text. The computer-readable text may be stored using an appropriate character-encoding scheme such as UTF-8 (UCS Transformation Format-8 Bit) for storing Unicode characters, ASCII (American Standard Code for Information Interchange) for storing English-language letters, numbers, and common punctuation, or using another appropriate encoding scheme.

OCR processing is often used in conjunction with physical document scanning to capture the text included in physical documents such as receipts, invoices, bank statements, business cards, resumes, and other types of documents. OCR may also be applied directly to electronic images, e.g., TIFF (Tagged Image File Format) images or other appropriate electronic images, to extract the depicted text into a computer-readable format.

BRIEF DESCRIPTION OF THE DRAWINGS

Some implementations are described with respect to the following figures.

DETAILED DESCRIPTION

Optical character recognition (OCR) engines have improved significantly since their initial introduction, but no OCR engine is capable of achieving perfect accuracy in all situations. To achieve improved accuracy rates, some OCR systems may utilize multiple OCR engines, e.g., operating in parallel, to process a single image, and the outputs of the multiple OCR engines may be analyzed to determine a most-likely accurate output, at least as determined by the particular system performing the analysis.

Such multiple OCR systems may use certain voting protocols to resolve the multiple OCR engine outputs into the most-likely accurate output, e.g., by outputting the text that was recognized by the highest number of OCR engines, or by defaulting to the output from the "most trusted" OCR engine in the event of a tie or a discrepancy amongst engines, or by outputting the text from the OCR engine indicating the highest level of confidence in its recognition of a particular output, for example. The voting protocols for these multiple OCR systems are typically based upon outputs from the OCR engines themselves (e.g., the recognized text and any associated confidence values that the OCR engine ascribes to its own recognition process, a count of concurring results among OCR engines, etc.) and/or using a predefined ranking of the trustworthiness of a particular OCR engine's accuracy (e.g., when in doubt, choose the "best" or "most trusted" OCR engine's result). These multiple OCR systems may be relatively static in that, once the voting protocols are defined, they remain in place until a new voting protocol is manually defined, e.g., by reprogramming the voting protocols themselves, or by adjusting the trustworthiness ranking of the OCR engines, for example.

In the present disclosure, knowledge of how particular OCR engines perform in specific contexts may be modeled and updated over time to improve the accuracy of an OCR system that utilizes multiple OCR engines. The multiple OCR engines used in the combined OCR system may implement entirely different approaches for determining a most-likely accurate output, or may implement similar approaches tuned with different system variables, or may include various combinations of such OCR engines. Regardless of the number or configuration of the multiple OCR engines, the combined OCR system may receive the outputs from multiple OCR engines, identify a specific document context associated with the input document being processed, and resolve any differences in the outputs, e.g., based on the respective outputs and the identified document context, to determine the most-likely accurate result. In addition, information that is learned about the various OCR engines and how they perform in the identified document context may be fed back to the system to update the model such that the processing of subsequent images is based on the updated model. In such a manner, the OCR system may evolve and improve over time.

Figure 1:
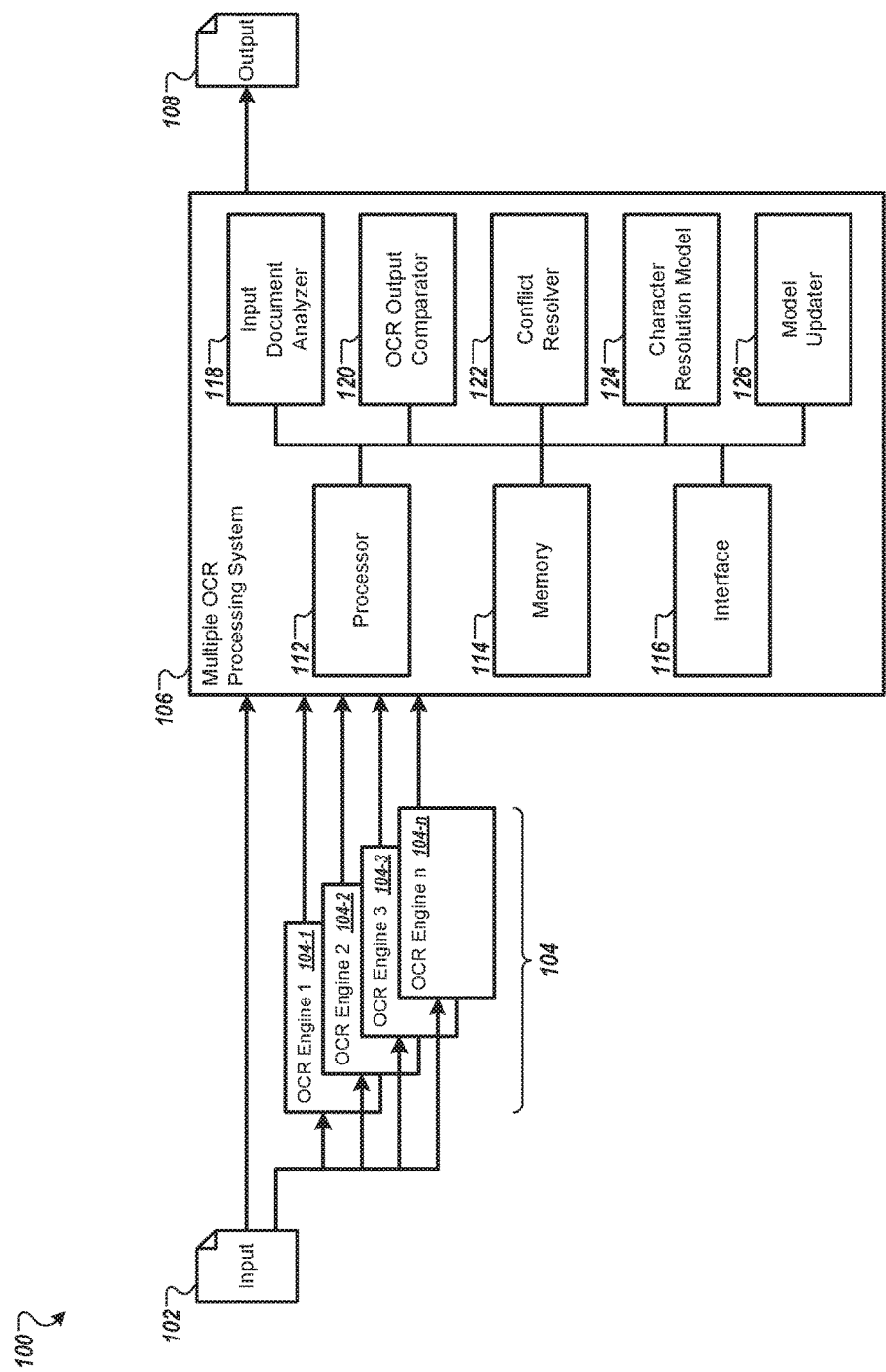
FIG. 1 is a block diagram of an example optical character recognition environment in accordance with implementations described herein.

FIG. 1 is a block diagram of an example optical character recognition environment 100. As shown, the example optical character recognition environment 100 includes an input document 102, multiple OCR engines 104, a multiple OCR processing system 106, and an output document 108. In operation, the input document 102 may be provided to the multiple OCR engines 104, which may each process the image separately and output recognized text to the multiple OCR processing system 106 for further analysis. The multiple OCR processing system may generate an output document 108 containing computer-readable text by applying a character resolution model to resolve differences among the outputs from the multiple OCR engines 104, as will be described in further detail below. The character resolution model may also be updated such that the model continues to evolve as additional input documents are processed.

The example topology of environment 100 may provide optical character recognition capabilities representative of various OCR environments, and the various systems and computing devices in environment 100 may be interconnected through one or more communications networks. However, it should be understood that the example topology of environment 100 is shown for illustrative purposes only, and that various modifications may be made to the configuration. For example, the optical character recognition environment 100 may include different or additional components, or the components may be connected in a different manner than is shown. In some implementations, for example, one or more of the OCR engines 104 may be configured to execute on, or may otherwise be integrated with, the multiple OCR processing system 106. Similarly, while the multiple OCR engines 104 are illustrated as including four separate OCR engines 104-1, 104-2, 104-3, and 104-*n*, respectively, any appropriate number or combination of OCR engines may be used in accordance with the techniques described here.

In environment 100, the input document 102 is provided to each of the multiple OCR engines 104 and to the multiple OCR processing system 106. Input document 102 may be processed synchronously or asynchronously by the multiple OCR engines 104. The input document 102 may generally include human-readable text depicted in an image. The input document 102 may be generated, for example, by a document scanner (not shown), which may convert a physical document into an electronic image. The input document 102 may also or alternatively be obtained, for example, from an electronic image repository or from another appropriate source.

The input document 102 may be associated with a certain document context. As used herein, the term "document context" should be understood to include information about the document that may be considered relevant in determining the text depicted in the document. As such, the document context of any given document may often be multivariate in nature. Various document contexts may include, for example, image attributes (e.g., image resolution, brightness, and/or contrast, image skew, source document quality, etc.), textual attributes (e.g., font, font size, typeface, character proximity, character type, surrounding characters, words, and/or phrases, etc.), content attributes (e.g., inclusion of graphics and/or handwriting in addition to text, content type, etc.), and/or metadata attributes (e.g., source, author, language, etc.), among others. Any of these attributes, either alone or in combination with others, may affect how well a particular OCR engine performs in accurately identifying the text in the document, and may also provide additional information to help the multiple OCR processing system 106 determine an appropriate output as described in greater detail below.

Each of the multiple OCR engines 104 may be configured using standards-based, open source, proprietary, or other available algorithms to identify the text depicted in input document 102, and to output the text in a computer-readable format. The multiple OCR engines 104 may implement entirely different approaches for determining the output text, or may implement similar approaches tuned with different system variables. The multiple OCR engines 104 may also or alternatively include various combinations of such OCR engines. For example, to achieve a high level of character recognition accuracy across disparate document contexts, it may be beneficial to include OCR engines from multiple different providers, some of which may be better than others in a particular context. Similarly, if it is known that the input documents are likely to have limited or controlled document contexts, then it may be beneficial to include multiple instances of a single OCR engine, where the multiple instances are tuned differently to specifically address the anticipated document contexts. As such, the techniques described here may provide implementation flexibility, allowing a system architect to select OCR engines from different providers and/or to implement different numbers or configurations of OCR engines to achieve a desirable balance of cost and character recognition accuracy. In addition, the techniques described here may allow the OCR engines used in a particular implementation to easily be changed over time—e.g., by adding or removing an OCR engine, by switching one or more of the OCR engines to a different OCR engine, or otherwise.

Since no OCR engine is capable of achieving perfect accuracy in all situations, the output text as provided from the multiple OCR engines 104 to the multiple OCR processing system 106 may include errors. The multiple OCR processing system 106 may generally be configured to determine an output that is most likely to be accurate based on an understanding of how well each of the multiple OCR engines 104 perform in the given document context Multiple OCR processing system 106 may include a processor resource 112, a memory resource, 114, an interface 116, an input document analyzer 118, an OCR output comparator 120, a conflict resolver 122, a character resolution model 124, and a model updater 126. It should be understood that the components shown here are for illustrative purposes, and that in some cases, the functionality being described with respect to a particular component may be performed by one or more different or additional components. Similarly, it should be understood that portions or all of the functionality may be combined into fewer components than are shown.

The multiple OCR processing system 106 may reside or be hosted on one or more computing devices, such as on a server, a workstation, a desktop, a laptop, or on another appropriate computing device. The multiple OCR processing system 106 may also be implemented as a distributed system, e.g., with portions of the functionality being spread across a group of computing devices operating together as a system.

Processor resource 112 may be configured to process instructions for execution by the multiple OCR processing system 106. The instructions may be stored on a non-transitory tangible computer-readable storage medium, such as in memory resource 114 or on a separate storage device (not shown), or on any other type of volatile or non-volatile memory that stores instructions to cause a programmable processor to perform the techniques described herein. Alternatively or additionally, the multiple OCR processing system 106 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, the processor resource 112 may include multiple processors and/or types of processors, and the memory resource 114 may include multiple memories and/or types of memory.

Interface 116 may be implemented in hardware and/or software, and may be configured, for example, to receive the respective outputs from the multiple OCR engines 104, such as the characters recognized from the input document 102, and/or any confidence values associated with the recognition of such characters. Interface 116 may also be configured to output the output document 108 to an appropriate consumer, such as to a user via a display, to a storage device, to an application, or the like.

The input document analyzer 118 may execute on the processor resource 112, and may analyze the input document 102 to identify the document context associated with the input document 102. Such analysis may include, for example, visual inspection of the input document 102. For example, the input document analyzer 118 may perform optical object scanning on the image to identify whether graphics, handwriting, or other non-textual objects are included in the image. Such visual inspection may also be used to determine other contextual attributes that may be included as part of the document context. The analysis may also or alternatively include file and/or metadata inspection of the input document 102. For example, the file itself or the metadata associated with the input document 102 (e.g., via tags or other metadata fields) may provide contextual information such as image resolution, source information, author information, language information, or the like. Other known processing techniques may also or alternatively be used to identify other appropriate attributes as part of the document context.

The document context associated with the input document 102 may include a number of applicable attributes and/or categories of attributes. The number and/or type of attributes used to define any particular document context may be implementation-specific and/or customizable. In some implementations, document contexts may be applied on a more granular level, e.g., as applicable to a certain portion of an image versus the entire image.

Document contexts may be defined to include, for example, image attributes associated with an image, textual attributes associated with the text depicted in an image, content attributes associated with content depicted in an image, or other appropriate attributes and/or combinations of attributes. Image attributes may include, for example, the resolution of the image, the brightness of the image, the contrast of the image, whether the document was scanned at an angle resulting in a skewed image, and/or the quality or condition of the source document. Textual attributes may include, for example, font(s) included in the document, typefaces, character proximity, and/or character types (e.g., alphabets for different languages, punctuation, recognized symbols, etc.). In addition, textual attributes may relate to the characters immediately surrounding the character(s) in question, such as surrounding characters, words, and/or phrases. Content attributes may include, for example, the inclusion of graphics and/or handwriting in addition to the text depicted in an image, or the type of content generally included in the document (e.g., content from chat rooms, text messages, and message boards may be interpreted much differently from that in novels or other publications). Document contexts may be defined at any appropriate level of granularity, and may be implementation-specific. For example, in some implementations, document contexts may include at least one image attribute, at least one textual attribute, and at least one content attribute.

The OCR output comparator 120 may execute on the processor resource 112, and may analyze the outputs received from the multiple OCR engines 104. The OCR output comparator 120 may provide synchronization functionality, e.g., using any of a number of appropriate techniques, to ensure that the various OCR outputs are properly aligned, e.g., such as on a character by character, word by word, or line by line basis, before comparing the characters. In the case where the various outputs from the multiple OCR engines 104 all agree, further processing to resolve any differences in the outputs may be unnecessary. However, in cases where the outputs from the multiple OCR engines 104 do not agree, the OCR output comparator 120 may identify such differences for processing and resolution by the conflict resolver 122.

The conflict resolver 122 may execute on the processor resource 112, and may generate output document 108 based on character resolution model 124 and the received OCR outputs. In some implementations, the character resolution model 124 may include a Bayesian prior probability distribution. The character resolution model 124 may define a probability of character recognition accuracy for each of the multiple OCR engines 104 given the document context, e.g., as identified by the input document analyzer 118. For example, the character resolution model 124 may specify that OCR engine 104-1 accurately identifies the characters "rn" as "r" and "n" (a difficult character pairing to distinguish from the single character "m") 99% of the time in an identified document context including a high resolution image depicting Helvetica font on a severely worn document that includes handwritten notes across the page. In this particular document context, OCR engine 104-2 may accurately identify the characters 97% of the time, and OCR engine 104-3 may accurately identify the characters 94% of the time. As such, even if OCR engines 104-2 and 104-3 agree that the character is an "m" (e.g., in a two to one vote), the conflict resolver 122 may output the characters "rn" based on the character recognition accuracy of OCR engine 104-1 in the particular document context.

The above example is relatively simplistic, but it should be understood that the character resolution model 124 may include an arbitrarily complex set of combinations of attributes and associated character recognition accuracies to achieve a desired level of OCR accuracy. It should also be understood that not all attributes will be identifiable in a given document. In such cases, the unidentifiable attributes may be described as such in the document context (e.g., font type=unknown), and the character resolution model 124 may have corresponding document contexts and associated character recognition accuracies defined as such.

The model updater 126 may execute on the processor resource 112, and may generate an updated character resolution model for subsequent use by the conflict resolver 122. In some implementations, the updated character resolution model may include a Bayesian posterior probability distribution, which may then be carried forward for use as the Bayesian prior probability distribution in subsequent conflict resolution processing. The updated character resolution model may be updated based on information learned during conflict resolution. For example, continuing with the above example, where the conflict resolver 122 identified the characters "rn" as the most-likely accurate output (e.g., based on the known accuracy of OCR engine 104-1 in such document contexts), the model updater 126 may update the model by indicating that this was another example of where OCR engine 104-2 and OCR engine 104-3 were incorrect by recognizing "m" instead of "rn". Similarly, various attributes of the document context may be updated individually or collectively to provide an updated model representing how such attributes affect character recognition accuracy for a particular OCR engine. As the character resolution model 124 continues to be updated with new information gained from additional OCR processing, the model evolves and adapts over time.

Figure 2:
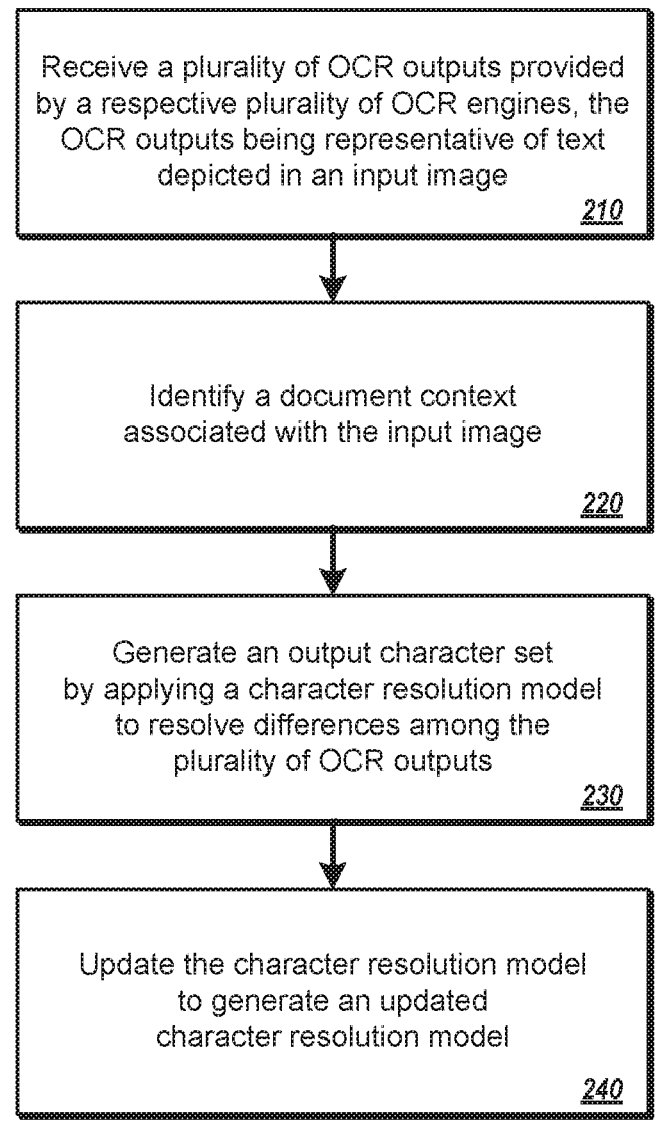
FIG. 2 is a flow diagram of an example optical character recognition process in accordance with implementations described herein.

FIG. 2 is a flow diagram of an example optical character recognition process 200. The process 200 may be performed, for example, by the multiple OCR processing system 106 illustrated in FIG. 1. For clarity of presentation, the description that follows uses the multiple OCR processing system 106 as the basis of an example for describing the process. However, it should be understood that another system, or combination of systems, may be used to perform the process or various portions of the process.

Process 200 begins when a plurality of OCR outputs provided by a respective plurality of OCR engines is received at block 210. Each of the OCR outputs may be representative of text depicted in a portion of an electronic image. For example, the OCR engines may be tasked with recognizing a single character or multiple characters at a particular portion of the image, or may be tasked with recognizing all of the characters in the image.

At block 220, the document context associated with the input image may be identified. For example, a document analyzer may use appropriate inspection techniques to identify certain image attributes associated with the image, to identify certain textual attributes associated with the text depicted in the image, and/or to identify certain content attributes associated with content depicted in the image. These attributes and/or others may be combined to form the document context, which may include any appropriate information about the document that may be relevant to determining the text depicted in the document. As a result, the document context is often multivariate in nature.

At block 230, an output character set may be generated by applying a character resolution model to resolve differences among the plurality of OCR outputs. The character resolution model may define a probability of character recognition accuracy for each of the plurality of OCR engines given the identified document context. In some implementations, the character resolution model may include a Bayesian prior probability distribution.

It should be understood that the character resolution model may include an arbitrarily complex set of combinations of attributes and associated character recognition accuracies to achieve a desired level of OCR accuracy. It should also be understood that not all attributes will be identifiable in a given document. In such cases, the unidentifiable attributes may be described as such in the document context (e.g., font type=unknown), and the character resolution model may have corresponding document contexts and associated character recognition accuracies defined as such.

At block 240, the character resolution model may be updated to generate an updated character resolution model such that subsequent generating of output character sets may be based on the updated character resolution model, The updated character resolution model may define an updated probability of character recognition accuracy for each of the plurality of OCR engines given various document contexts. In some implementations, the updated character resolution model may include a Bayesian posterior probability distribution, As the character resolution model continues to be updated with new information gained from additional OCR processing, the model evolves and adapts over time.

Figure 3:
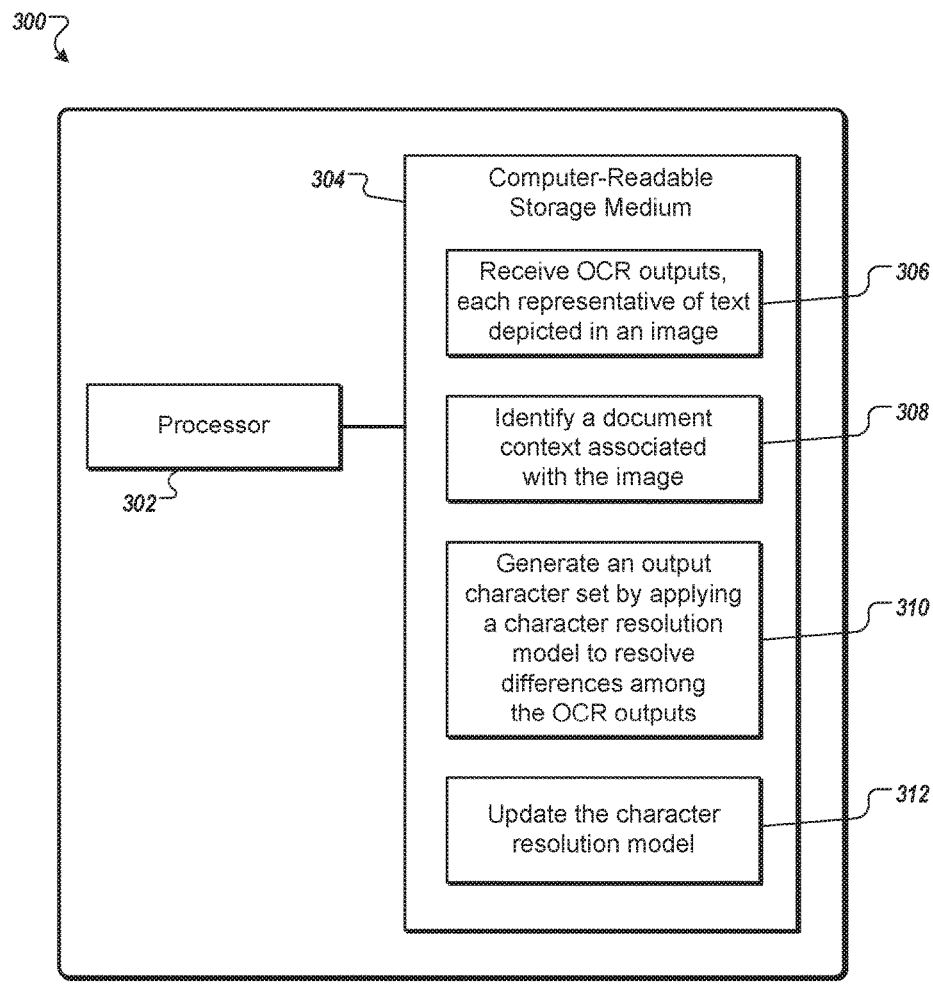
FIG. 3 is a block diagram of an example computing system that includes a computer-readable storage medium with optical character recognition instructions in accordance with implementations described herein.

FIG. 3 is a block diagram of an example computing system 300 that includes a computer-readable storage medium with optical character recognition instructions. Computing system 300 includes a processor resource 302 and a computer-readable storage medium 304.

Processor resource 302 may include a central processing unit (CPU), microprocessor (e.g., semiconductor-based microprocessor), and/or other hardware device suitable for retrieval and/or execution of instructions stored in computer-readable storage medium 304. Processor resource 302 may fetch, decode, and/or execute instructions 306, 308, 310, and 312 to perform optical character recognition, as described below. As an alternative or in addition to retrieving and/or executing instructions, processor resource 302 may include an electronic circuit comprising a number of electronic components for performing the functionality of instructions 306, 308, 310, and 312.

Computer-readable storage medium 304 may be any suitable electronic, magnetic, optical, or other physical storage device that contains or stores executable instructions. Thus, computer-readable storage medium 304 may include, for example, a random-access memory (RAM), an Electrically Erasable Programmable Read-Only Memory (EEPROM), a storage device, an optical disc, and the like. In some implementations, computer-readable storage medium 304 may include a non-transitory storage medium, where the term "non-transitory" does not encompass transitory propagating signals. As described below, computer-readable storage medium 304 may be encoded with a set of executable instructions 306, 308, 310, and 312.

Instructions 306 may receive a plurality of OCR outputs provided by a respective plurality of OCR engines, where each of the OCR outputs is representative of text depicted in a portion of an electronic image. Instructions 308 may identify a document context associated with the electronic image. Instructions 310 may generate an output character set by applying a character resolution model to resolve differences among the plurality of OCR outputs. The character resolution model used by instructions 310 may define a probability of character recognition accuracy for each of the plurality of OCR engines given the document context identified by instructions 308. Instructions 312 may update the character resolution model to generate an updated character resolution model such that subsequent generating of output character sets by instructions 310 are based on the updated character resolution model.

Although a few implementations have been described in detail above, other modifications are possible. For example, the logic flows depicted in the figures may not require the particular order shown, or sequential order, to achieve desirable results. In addition, other steps may be provided, or steps may be eliminated, from the described flows. Similarly, other components may be added to, or removed from, the described systems. Accordingly, other implementations are within the scope of the following claims.

What is claimed is:

1. A method comprising:
receiving, at a processor of a computing system, text outputs from a plurality of optical character recognition (OCR) engines, wherein each of the plurality of OCR engines receives an image of a document and generates an output representative of text depicted in the image of the document;
analyzing, by the processor, the image of the document to identify metadata describing attributes of the document
identifying, by the processor, a difference among the text outputs of the plurality of OCR engines;
resolving, by the processor, the difference among the text outputs of the plurality of OCR engines, by determining a probability of character recognition accuracy for each of the plurality of OCR engines based on the metadata describing the attributes of the document and selecting a character outputted by one of the OCR engines that has a highest probability of character recognition accuracy to be included in an output character set; and
generating, by the processor, the output character set to represent the text in the document.

2. The method of claim 1, wherein determining the probability of character recognition accuracy and selecting the character outputted by the OCR engine that has the highest probability of character recognition accuracy are caused by applying a character resolution model that comprises a Bayesian prior probability distribution.

3. The method of claim 2, further comprising:
updating the character resolution model based on the resolving of the difference to generate an updated character resolution model such that subsequent generating of output character sets is based on the updated character resolution model.

4. The method of claim 1, wherein determining the probability of character recognition accuracy for each of the plurality of OCR engines is based on metadata indicating image resolution of the image of the document.

5. The method of claim 1, wherein the metadata describing the attributes of the document comprises author information associated with the text depicted in the image of the document.

6. The method of claim 1, wherein the metadata describing the attributes of the document comprises language information associated with the text depicted in the image of the document.

7. The method of claim 1, wherein the metadata describing the attributes of the document comprises an image attribute associated with the image of the document, and a content attribute associated with content depicted in the image of the document.

8. A system comprising:
a processor resource; and
a memory storing instructions that when executed by the processor resource cause the processor resource to:
analyze an image of an input document to identify metadata describing attributes of the input document,
receive outputs from a plurality of optical character recognition (OCR) engines, wherein each of the plurality of OCR engines receives the image of the input document and generates an output representative of text depicted in the image of the input document,
identify a difference among the outputs of the plurality of OCR engines,
resolve the difference among the outputs of the plurality of OCR engines based on a character resolution model that utilizes the metadata describing the attributes of the input document and the outputs of the plurality of OCR engines, the character resolution model causing the processor resource to determine a probability of character recognition accuracy for each of the plurality of OCR engines based on the metadata describing the attributes of the input document, and select a character outputted by one of the OCR engines that has a highest probability of character recognition accuracy to be the character for an output document, and
update the character resolution model based on the resolving of the difference to generate an updated character resolution model for subsequent use.

9. The system of claim 8, wherein the character resolution model comprises a Bayesian prior probability distribution.

10. The system of claim 9, wherein the updated character resolution model comprises a Bayesian posterior probability distribution.

11. The system of claim 8, wherein the metadata describing the attributes of the document comprises an image attribute associated with the image of the input document.

12. The system of claim 8, wherein the metadata describing the attributes of the document comprises author information associated with the text depicted in the image of the input document.

13. The system of claim 8, wherein the metadata describing the attributes of the document comprises a content attribute associated with content depicted in the image of the input document.

14. The system of claim 8, wherein the metadata describing the attributes of the document comprises an image attribute associated with the image of the input document, and a content attribute associated with content depicted in the image of the input document.

15. A non-transitory computer-readable storage medium storing instructions that, when executed, cause a processor resource to:
receive outputs from a plurality of optical character recognition (OCR) engines, wherein each of the plurality of OCR engines receives an image of a document and generates an output representative of text depicted in the image of the document;
analyze the image of the document to identify metadata describing attributes of the document
identify a difference among the outputs of the plurality of OCR engines;
resolve the difference among the outputs of the plurality of OCR engines, by determining a probability of character recognition accuracy for each of the plurality of OCR engines based on the metadata describing the attributes of the document and selecting a character outputted by one of the OCR engines that has a highest probability of character recognition accuracy to be included in an output character set; and
generate the output character set to represent the text in the document.

16. The non-transitory computer-readable storage medium of claim 15, wherein the instructions are to cause the processor resource to apply a character resolution model that comprises a Bayesian prior probability distribution to determine the probability of character recognition accuracy and select the character outputted by the OCR engine that has the highest probability of character recognition accuracy.

17. The non-transitory computer-readable storage medium of claim 16, wherein the instructions are to cause the processor resource to update the character resolution model based on the resolving of the difference to generate an updated character resolution model that comprises a Bayesian posterior probability distribution.

18. The non-transitory computer-readable storage medium of claim 15, wherein the metadata describing the attributes of the document comprises an image attribute associated with the image of the document, and a content attribute associated with content depicted in the image of the document.

19. The non-transitory computer-readable storage medium of claim 15, wherein the instructions to cause the processor resource to identify the difference among the outputs of the plurality of OCR engines include instructions to cause the processor resource to:
align the outputs of the plurality of OCR engines with each other on a character by character basis; and
compare the characters among the outputs of the plurality of OCR engines to identify differences of the characters among the outputs of the plurality of OCR engines.

20. The method of claim 1, wherein identifying the difference among the text outputs of the plurality of OCR engines includes:
aligning the text outputs of the plurality of OCR engines with each other on a character by character basis; and
comparing the characters among the text outputs of the plurality of OCR engines to identify differences of the characters among the text outputs of the plurality of OCR engines.

* * * * *